US007917453B2

(12) United States Patent
Auberger et al.

(10) Patent No.: US 7,917,453 B2
(45) Date of Patent: Mar. 29, 2011

(54) MAIL FRANKING SYSTEM WITH A SECURE EXTERNAL PRINTING MODE

(75) Inventors: Romuald Auberger, Montrouge (FR); Damien Hasse, Sainte Genevieve des Bois (FR)

(73) Assignee: Neopost Technologies, Bagneux (FR)

( * ) Notice: Subject to any disclaimer, the term of this patent is extended or adjusted under 35 U.S.C. 154(b) by 1451 days.

(21) Appl. No.: 11/046,509

(22) Filed: Jan. 27, 2005

(65) Prior Publication Data

US 2005/0192910 A1 Sep. 1, 2005

(30) Foreign Application Priority Data

Jan. 30, 2004 (FR) ...................................... 04 00899

(51) Int. Cl.
*G06F 7/00* (2006.01)
*G07B 17/02* (2006.01)

(52) U.S. Cl. ....................................... 705/401; 705/408

(58) Field of Classification Search .................. 705/401, 705/408
See application file for complete search history.

(56) References Cited

U.S. PATENT DOCUMENTS 5,729,461 A * 3/1998 D'Andrea et al. ............ 705/408
5,988,897 A * 11/1999 Pierce et al. .................... 400/61
6,182,566 B1 * 2/2001 Kubatzki et al. ................ 101/93
2002/0002544 A1 * 1/2002 Leon et al. ....................... 705/61
2003/0028497 A1 * 2/2003 Leon ............................. 705/408
2003/0061177 A1 3/2003 Blanluet et al. ............... 705/408
2004/0064424 A1 * 4/2004 Schilling et al. .............. 705/406
2007/0124260 A1 * 5/2007 Meyer et al. .................. 705/404

FOREIGN PATENT DOCUMENTS

EP 0 718 803 A2 6/1996
EP 0 772 162 A2 5/1997
EP 0 775 984 A2 5/1997
EP 0 811 955 A2 12/1997
EP 2 768 534 A1 3/1999

* cited by examiner

*Primary Examiner* — John W Hayes
*Assistant Examiner* — David J Clark
(74) *Attorney, Agent, or Firm* — Sughrue Mion, PLLC

(57) ABSTRACT

To print a postal imprint by an external imprint label dispenser connected via a communications link to a postage meter, during an initialization step for initializing the communications link, the postage meter authenticates the imprint label dispenser by exchanging an authentication code and the postage meter securely transmits to the dispenser a predetermined image data set that is signed with a secret key generated during the initialization step on the basis of the authentication code. Then, for each printing cycle, the postage meter computes postal data relating to the mail item that is to be franked, securely transmits the resulting computed data as signed with the secret key to the dispenser, converts the postal data into additional image data, and prints a postal imprint incorporating the additional image data and the predetermined image data on a continuous label tape delivered by the dispenser.

7 Claims, 2 Drawing Sheets

MAIL FRANKING SYSTEM WITH A SECURE EXTERNAL PRINTING MODE

CROSS-REFERENCE TO RELATED APPLICATIONS

This applications claims priority from French Patent Application No. 04 00899 filed Jan. 30, 2004.

TECHNICAL FIELD

The present invention relates exclusively to the field of mail handling, and it relates more particularly to a method and a system for franking mail that allow a postal imprint to be printed in two printing modes. One mode is a conventional mode of printing from a postage meter, and the other mode is a more novel mode of printing from a label dispenser connected to said postage meter.

PRIOR ART

A postage meter is often provided with a label dispenser that is integrated into its print module and that can thus affix a postal imprint either directly on the envelope, or else on a pre-cut label coming from said dispenser. For example, when an operator wishes to frank a parcel, said operator weighs said parcel upstream from the postage meter (as indeed said operator would do for an envelope), but it is downstream from said postage meter that the operator must go and retrieve the imprint label so as then to stick it onto the parcel.

In addition, such integrated dispensers generally use gummed labels that need to be moistened, or self-adhesive labels that have silicone-containing films to be detached and that are cut to predetermined lengths (the label is often pre-cut in only two sizes: small or large).

Adding an external label dispenser having an unreelable tape, such as the dispenser described in the Applicant's Patent Application FR 2 829 269, thus offers major advantages compared with integrated dispensers by mitigating the above-mentioned drawbacks. However, since the postal imprint constitutes a monetary value, it is essential that the printing performed at the label dispenser corresponds exactly to the amounts of the postal imprints accounted for by the postage meter.

OBJECT AND DEFINITION OF THE INVENTION

An object of the present invention is thus to provide a method of having a postal imprint printed by an external imprint label dispenser connected via a communications link to a postage meter, which method guarantees that the postage amounts accounted for are identical to the imprints printed. To this end, during an initialization step for initializing the communications link, the postage meter authenticates the imprint label dispenser by exchanging an authentication code and the postage meter securely transmits to the imprint label dispenser a predetermined image data set that is signed with a secret key generated during said initialization step on the basis of said authentication code. Then, for each printing cycle, the postage meter computes postal data relating to the mail item that is to be franked, securely transmits the resulting computed data as signed with said secret key to the imprint label dispenser, converts said postal data into additional image data, and prints a postal imprint incorporating said additional image data and said predetermined image data on a continuous label tape delivered by the imprint label dispenser.

Thus, by means of this secure transmission in two stages using a secret key developed on the basis of the dispenser authentication code, it is simple to guarantee franking security while also anticipating the printing of the postal imprint, and it is also possible to reduce the data transfer time significantly.

Preferably said predetermined image data includes at least standard postage stamp backgrounds.

Advantageously, said postal data interchanged is compressed using a predetermined compression algorithm.

Preferably, said step in which successive postal imprints are printed onto said continuous label tape is performed in staggered manner.

The present invention also provides a mail franking system in which at least one postage meter is connected via a communications link to an external imprint label dispenser. The postage meter is provided with first transmitter means for acting, during an initialization step for initializing the communications link, to transmit a predetermined image data set in secure manner to the imprint label dispenser, and first processor means for acting, at each printing cycle, to generate a secret key on the basis of an authentication code delivered by the imprint label dispenser and to compute, at the postage meter, postal data relating to the mail item that is to receive the postal imprint. The first transmitter means then, on each successive printing cycle, transmits the resulting computed postal data in a secure manner to the imprint label dispenser. The imprint label dispenser is provided with second processor means for converting said postal data into additional image data and with print means for printing a postal imprint incorporating said additional image data and said predetermined image data on a continuous label tape delivered by the imprint label dispenser.

Preferably, the first processor means further include compression means for compressing the postal data transmitted to the imprint label dispenser, and signature means for signing the compressed postal data on the basis of said secret key.

BRIEF DESCRIPTION OF THE DRAWINGS

The invention will be better understood on reading the following detailed description accompanied by illustrative and non-limiting examples with reference to the following figures, in which.

DETAILED DESCRIPTION OF EMBODIMENTS

A mail franking system is made up conventionally of at least one postage meter 10 incorporating a print module for printing a postal imprint, and of a weigh module 12 that is disposed upstream from said postage meter to which it is connected, and that serves to weigh the mail items, envelopes or parcels that are to receive postal imprints from the postage meter. The postage meter which, as is known, is provided with secure accounting means, frequently incorporates a label dispenser in order to make it possible to frank thick envelopes or parcels that cannot be handled directly by the postage meter (typically, a postage meter is limited to printing envelopes that are of thickness less than 16 millimeters (mm)).

Figure 1:
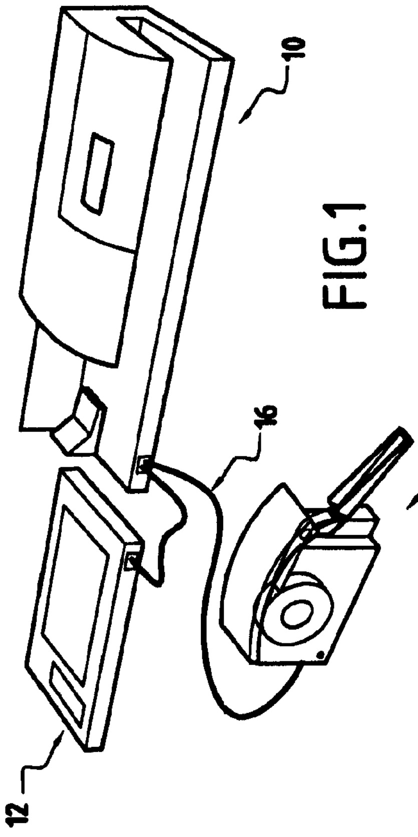
FIG. 1 is a perspective view of a mail franking system, which system incorporates an imprint label dispenser of the invention.

In the invention, as shown in FIG. 1, the postage meter proper does not have an integrated label dispenser, but rather the mail franking system is provided with an imprint label dispenser 14, which dispenser is disposed externally to the postage meter 10, and in the immediate vicinity of the weigh module 12. This independent module, of the type described in the Applicant's Patent Application FR 2 829 269 makes the mail franking system of the invention more flexible because, by means of its integrated cutter device, it makes it possible to deliver labels of desired length (rather than merely of predetermined length) cut from a continuous tape, and it thus avoids the operator being forced to go and retrieve the labels at the outlet of the postage meter while the parcel to be franked is situated upstream from said postage meter, on the weigh module.

Figure 2:
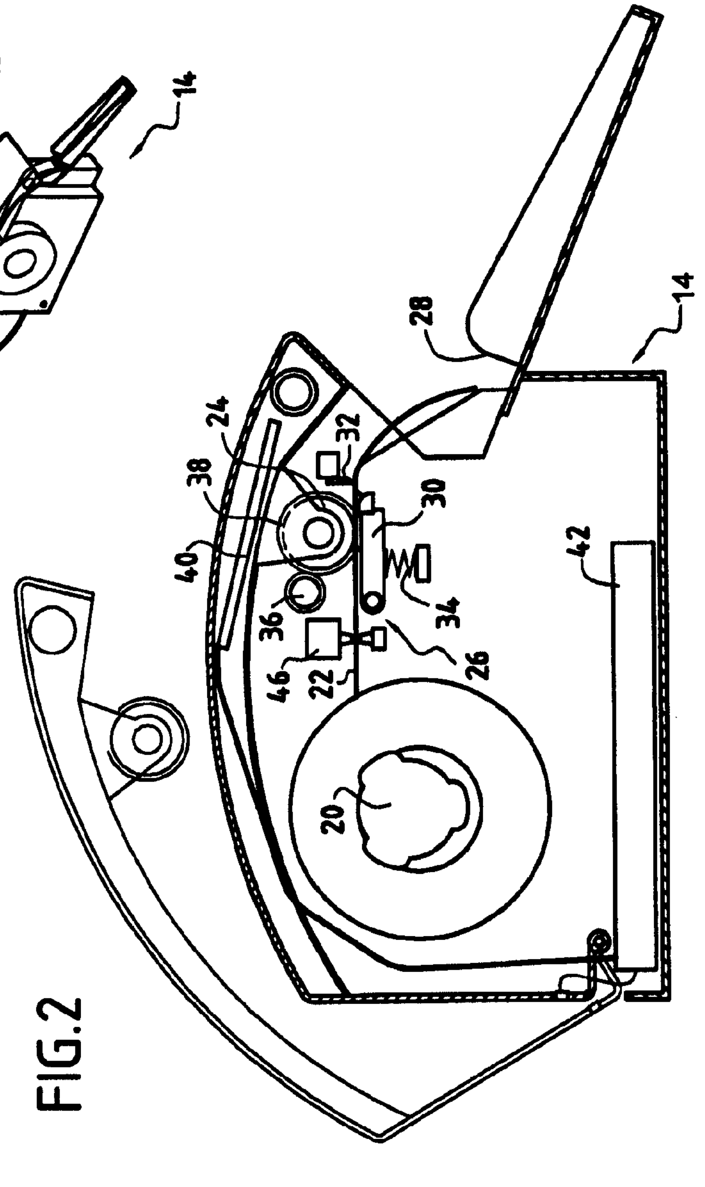
FIG. 2 is a longitudinal section view of the imprint label dispenser of FIG. 1.

However, it should be noted that in the above-mentioned application, the imprint label dispenser is incorporated into a modular mail-handling system and it is thus provided with wireless communications means for connecting said dispenser to a computer control terminal also controlling a postage meter which is then without individual controls. In the present invention, such a wireless configuration is not justified (although it remains possible) because the postage meter 10 is independent in this context (without an external control terminal) and the imprint label dispenser 14, such a dispenser being shown in longitudinal section in FIG. 2, can thus more simply be connected directly to the postage meter via a conventional wired communications link 16.

This dispenser includes a freely rotatably mounted roller 20 onto which a continuous tape 22 of labels to be cut out is wound, at least one drive wheel 24 for unreeling the tape along a conveyor path 26 of the dispenser form the roller to an outlet 28 for imprint labels, a print module 30 of the thermal type (or else of the ink jet type) for printing a postal imprint on an unreeled portion of said tape, and a cutter module 32 placed on the conveyor path, advantageously at the outlet of the print module.

The capstan-type drive wheel 24 which unreels the label tape, by acting on the print module in opposition to a spring 34, is actuated by a control micro-motor 36 through a transmission 38 having toothed wheels. The print module and the control micro-motor of the capstan that is actuated in synchronism with the printing and with the cutter module, are powered from drive, power supply, and control means 40 for driving, powering, and controlling the heater elements of the thermal module (or the nozzles of the ink jet module), which elements are managed from the processor means 42 (advantageously having a microprocessor). The processor means incorporate the software means necessary for receiving and processing the postal imprint printing instructions coming from the postage meter. Finally, an end-of-tape detector 46 is also provided in order to monitor accurately the unreeling of the continuous tape, thereby avoiding printing only part of the last postal imprint.

Figure 4:
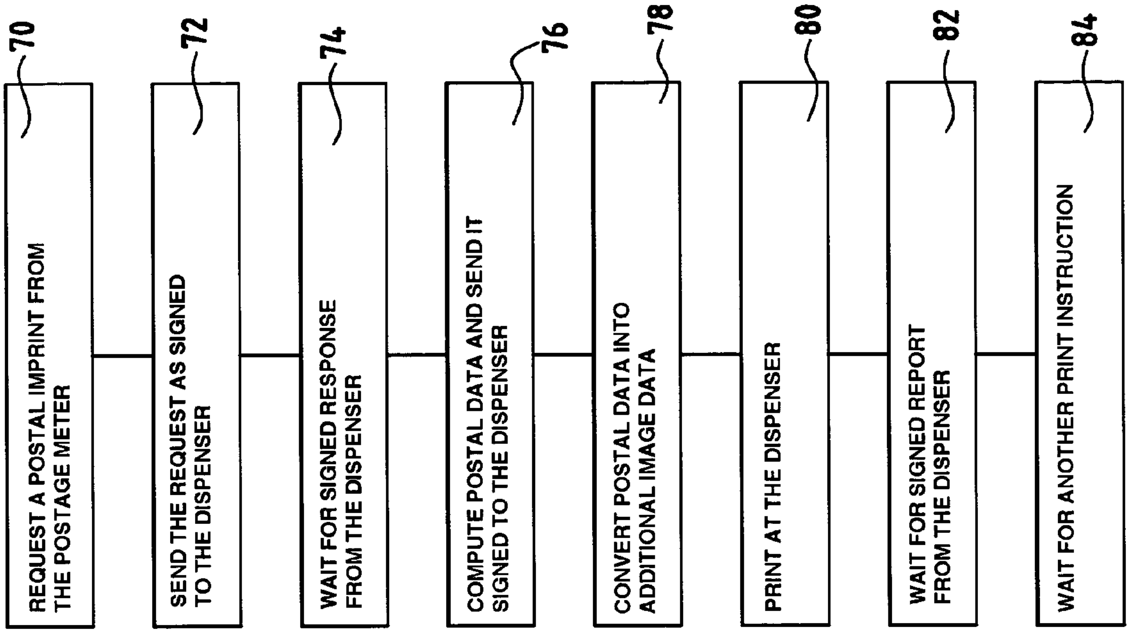
FIG. 4 is a flow chart showing the printing cycle of the invention for printing a postal imprint.
Figure 3:
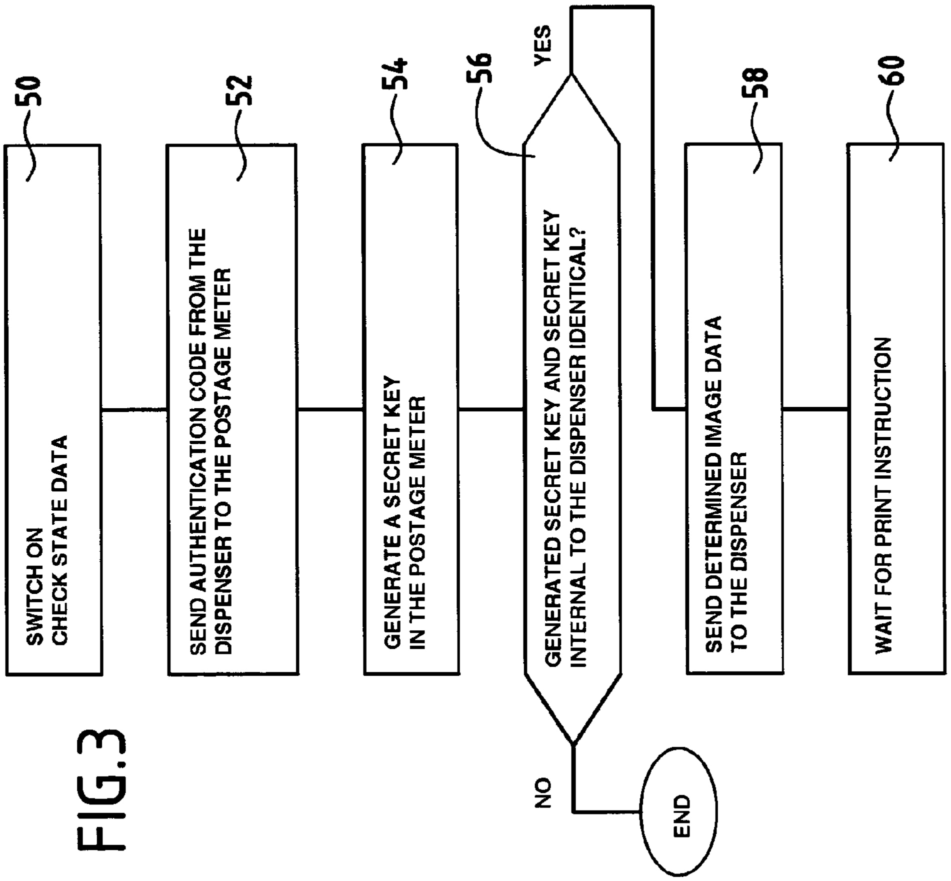
FIG. 3 is a flow chart showing the initialization stage preceding the printing cycle of the invention for printing a postal imprint.

A description is given below, with reference to FIGS. 3 and 4, of method of having a postal imprint printed by the imprint label dispenser 14, which dispenser is connected via the communications link 16 to the postage meter 10. The method is essentially organized into two stages that take place firstly during an initialization stage for initializing the communications link of the franking system and secondly (FIG. 4) during a printing stage for printing the postal imprint proper.

During the initialization stage for initializing the communications link (FIG. 3), and after switching on, in a first step 50, the imprint label dispenser is checked for various state data such as presence of paper, non-obstruction of ejection nozzles, and verification of power supply voltage, of temperature, and of lid closure. Then, during a step 52, an authentication code for authenticating the imprint label dispenser, which code is pre-recorded when said dispenser is manufactured, is transmitted (via first transmitter means) to the postage meter for the purpose of having the dispenser authenticated by the postage meter. On the basis of said code and of a master key generated when it was manufactured, the postage meter then, in a step 54 (via first processor means) generates a secret key that then serves to sign all communications between the dispenser and the postage meter. The generation algorithm is advantageously of the known triple DES (Data Encryption Standard) type. Said secret key is then sent to the dispenser, in a step 56, for comparison with a secret key internal to said dispenser and generated when it was manufactured. If the two keys are not identical, the process is terminated, and only test printouts can be performed at the dispenser, and under no circumstances can postal imprints be printed. Conversely, when the keys are identical, and in another stage 58, a predetermined image data set is transmitted in secure manner (also by the first transmitter means) from the postage meter to the imprint label dispenser. Said image data includes in particular images relating to standard postage stamp backgrounds which differ depending on the country in question, and also to slogans and to other information in general of the non-postal type (e.g. mini-die prints in Germany or in Canada. Once this data is transmitted, the imprint label dispenser is then, in step 60, in a standby position waiting for a print instruction for launching a first printing cycle.

The printing stage (FIG. 4) is repeated for each printing cycle. It starts in a step 70 with a request being made to the postage meter for a postal imprint, which request is forwarded to the dispenser, in a following step 72, the print request being signed by means of the above-mentioned secret key. In another step 74, the postage meter then waits for a response that is also signed in order to act in a step 76 to compute (in the first processor means) postal data relating to the mail item that is to receive the postal imprint, and to send (via the first transmitter means) the resulting computed data to the imprint label dispenser, such transmission being made secure, like the preceding communications, by signing the data sent by means of the secret key generated during the initialization step on the basis of the authentication code.

The postal data transmitted, advantageously in a compressed form (compressed using a standard compression algorithm), differs depending on the country in question, but said data includes, at least, a postal imprint value, a postal imprint date, and a contract number. In addition to such minimum data, the following can also be communicated: a postage meter number, a post code or "ZIP" code, a matrix authentication code, a check code, an object category, an up-count or a down-count value, a clock time, etc.

The dispenser in possession of said data can then, in a step 78, convert it into additional image data (via second processor means), and then, in a following step 80, print (using print means) the postal imprint incorporating the additional image data resulting from the conversion and the image data transmitted during the initialization stage on a continuous label tape delivered by the imprint label dispenser. After this printing, in a step 82, the dispenser sends a signed report to the postage meter and, in a standby step 84, positions itself ready to print again. Imprints can thus be printed in succession, the printing of the successive postal imprints on the continuous label tape from the imprint label dispenser can advantageously be performed in staggered manner so as to enable use to be made of all of the heater elements (or all of the ejection nozzles depending on the technology used) of the print head of said dispenser.

Thus, the data necessary for a postal imprint to be printed by the dispenser is transferred in two distinct stages, and in entirely secure manner. During an initialization stage, i.e. each time the franking system is switched on, only the various available postage stamp backgrounds are transferred in secure manner (they are thus deleted each time the system is switched off) together with image data constituted by the slogan or by other non-postal information of the postal imprint. Then, as soon as the printing stage is launched by the operator of the postage meter, it is the postal data proper (postal imprint value, postal imprint date, contract number, etc.) that are sent in secure manner, together with the precise layout of the various component portions of the type of postage stamp chosen for the postal imprint, which layout is necessary for having additional image data generated by the imprint label dispenser.

This specific organization makes it possible to obtain a short, optimized response time between start-up of the printing cycle launched by the operator of the postage meter and printing proper at the imprint label dispenser, in particular due to the facts that the largest amount of data is transferred during the initialization stage, and that certain computing operations are performed while other tasks are being performed, and therefore without requiring time to be specifically dedicated to them.

What is claimed is:

1. A method of having a postal imprint printed by an external imprint label dispenser connected via a communications link to a postage meter, said method comprising:

during an initialization step for initializing the communications link, the postage meter authenticates the imprint label dispenser by exchanging an authentication code and the postage meter securely transmits to the imprint label dispenser a predetermined image data set that is signed with a secret key generated during said initialization step on the basis of said authentication code and following said initialization step, for each printing cycle, the postage meter computes postal data relating to the mail item that is to be franked, securely transmits the resulting computed data as signed with said secret key to the imprint label dispenser, and the imprint label dispenser converts said postal data into additional image data, and prints a postal imprint incorporating said additional image data and said predetermined image data on a continuous label tape delivered by the imprint label dispenser.

2. A method of printing a postal imprint according to claim 1, wherein said predetermined image data includes at least standard postage stamp backgrounds.

3. A method of printing a postal imprint according to claim 1, wherein said postal data interchanged is compressed using a predetermined compression algorithm.

4. A method of printing a postal imprint according to claim 1, wherein said step in which successive postal imprints are printed onto said continuous label tape is performed in staggered manner.

5. A mail franking system, comprising:

at least one postage meter; and an external imprint label dispenser connected via a communications link to said at least one postage meter, wherein said postage meter includes:

a first transmitter for first transmitting, during an initialization step for initializing the communications link, a predetermined image data set in secure manner to the imprint label dispenser, and a first processor for generating, at each printing cycle, a secret key on the basis of an authentication code delivered by the imprint label dispenser and computing, at the postage meter, postal data relating to the mail item that is to be franked, the first transmitter then, on each successive printing cycle, transmitting the resulting computed postal data in secure manner to the imprint label dispenser, and wherein the imprint label dispenser includes:

a second processor for converting said postal data into additional image data and a print module for printing a postal imprint incorporating said additional image data and said predetermined image data on a continuous label tape delivered by the imprint label dispenser.

6. A mail franking system according to claim 5, wherein said first processor further includes a compression module for compressing the postal data transmitted to the imprint label dispenser.

7. A mail franking system according to claim 6, wherein said first processor further includes a signature module for signing the compressed postal data on the basis of said secret key.

* * * * *